W. R. LORENZ.
LOCK NUT.
APPLICATION FILED MAR. 9, 1920.
1,344,544.
Patented June 22, 1920.
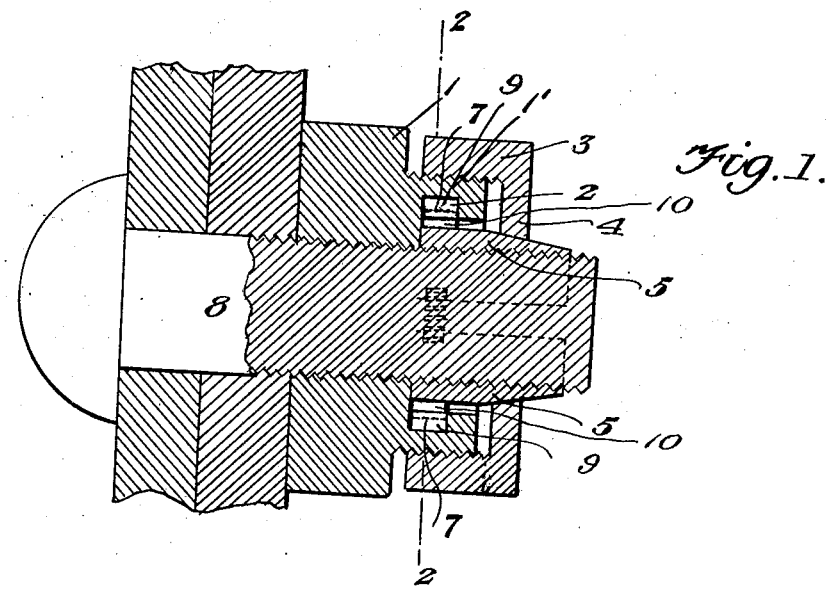
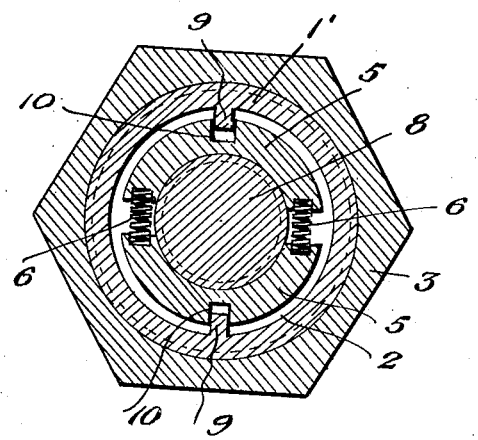
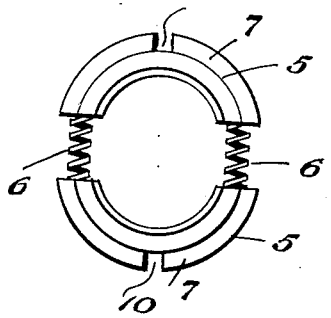
William R. Lorenz
INVENTOR
BY Victor J. Evans
ATTORNEY

UNITED STATES PATENT OFFICE.

WILLIAM R. LORENZ, OF DENVER, COLORADO.

LOCK-NUT.

1,344,544.  Specification of Letters Patent.  Patented June 22, 1920.

Application filed March 9, 1920. Serial No. 364,486.

*To all whom it may concern:*

Be it known that I, WILLIAM R. LORENZ, a citizen of the United States, residing at Denver, in the county of Denver and State of Colorado, have invented new and useful Improvements in Lock-Nuts, of which the following is a specification.

This invention relates to means for locking nuts on bolts and the principal object of the invention is to provide wedge means for gripping the bolt with means for forcing the wedges inwardly after the nut has been screwed home.

Another object of the invention is to connect the wedge means and the actuating means therefor to the nut so that they will move with the nut while the same is being screwed on the bolt.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view of a nut constructed in accordance with my invention.

Fig. 2 is a cross section on line 2—2 of Fig. 1.

Fig. 3 is an end view of the clamps.

In these views 1 indicates the nut which is provided with a reduced extension 1' on its outer face. This extension is provided with an annular groove 2 formed in its interior wall and the bore of this extension between said groove and its outer end is of greater diameter than the bore of the nut and the rest of the extension. The exterior of the extension is screw threaded to receive the screw threaded sleeve 3 which fits over the same and this sleeve is provided with an internal flange 4 at its outer end. The wedges or clamps 5 are of semi-circular form and these clamps are connected together at the ends by the springs 6. The inner ends of these clamps are each provided with the outwardly extending flange 7 for engaging the groove 2 in the extension of the nut. The outer ends of these clamps are of wedge-shape or beveled as shown and are adapted to engage the flange 4 on the sleeve. These clamps or wedges are also screw threaded upon their interior faces to engage the screw threads on the bolt, said bolt being shown at 8.

Before the nut is placed on the bolt the sleeve is partly unscrewed so as to permit the clamps to fit loosely on the bolt. The nut is then screwed home on the bolt, the flange and sleeve being carried with it. After the nut is screwed home the sleeve is tightened on the extension so that its flange moving along the beveled parts of the clamps will force said clamps inwardly so that they will tightly grip the bolt and thus prevent the nut from working loose.

I connect the clamps with the nut 1 by means of the nibs 9 on said nut engaging the notches 10 in the clamps so that as the nut is turned the clamp will also be turned.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a nut having a screw threaded extension, said extension having an interior groove, a pair of semi-circular clamping members each having a flange thereon non-rotatively engaging the groove and a beveled outer end, a screw threaded sleeve engaging the screw threaded extension and a flange on said sleeve for engaging the beveled parts of the clamps for forcing the clamps against the bolts.

2. A device of the class described comprising a nut having a screw threaded extension, an annular interior groove in said extension, a pair of semi-circular clamping members, each having a flange thereon non-rotatively engaging the groove and a beveled outer end, spring means for holding said members apart, a screw threaded sleeve engaging the screw threaded extension and having a flange thereon for engaging the beveled parts of the clamp for forcing the same against the bolt and means for movably connecting the clamping members with the extension.

In testimony whereof I affix my signature.

WILLIAM R. LORENZ.